(12) United States Patent
Peterson

(10) Patent No.: US 11,992,974 B2
(45) Date of Patent: May 28, 2024

(54) SYSTEMS AND METHODS FOR MAKING AND/OR USING COMPOSITE TUBE STRUCTURES FORMED OF HYBRID LAMINATES

(71) Applicant: Eagle Technology, LLC, Melbourne, FL (US)

(72) Inventor: Ian D. Peterson, Rochester, NY (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 447 days.

(21) Appl. No.: 17/528,925

(22) Filed: Nov. 17, 2021

(65) Prior Publication Data

US 2022/0072739 A1 Mar. 10, 2022

Related U.S. Application Data

(62) Division of application No. 16/563,663, filed on Sep. 6, 2019, now Pat. No. 11,207,801.

(51) Int. Cl.
*H01Q 1/12* (2006.01)
*B29C 33/02* (2006.01)
(Continued)

(52) U.S. Cl.
CPC ............ *B29C 33/02* (2013.01); *B29C 70/44* (2013.01); *H01Q 1/12* (2013.01); *B29K 2707/02* (2013.01);
(Continued)

(58) Field of Classification Search
CPC ....... B29C 33/02; B29C 70/44; B29C 53/566; H01Q 1/12; H01Q 1/288; H01Q 1/1235;
(Continued)

(56) References Cited

U.S. PATENT DOCUMENTS 4,664,644 A 5/1987 Kumata et al.
4,963,210 A 10/1990 Corr et al.
(Continued)

FOREIGN PATENT DOCUMENTS

DE 102004039505 A1 6/2005
EP 0487549 A4 4/1993
(Continued)

OTHER PUBLICATIONS

Thomson, M.W., The AstroMesh Deployable Reflector, IMSC 1997, 7510-117-01.
(Continued)

*Primary Examiner* — Jean B Jeanglaude
(74) *Attorney, Agent, or Firm* — Fox Rothschild LLP; Carol Thorstad-Forsyth

(57) ABSTRACT

Systems and methods for making and/or using a hybrid laminate composite tube structure. The methods comprise: wrapping a plurality of lamina layers around a male cylindrical tool (e.g., mandrel); treating the lamina layers with heat/pressure to form the hybrid laminate composite tube structure; and assembling a structure by adhesively bonding the hybrid laminate composite tube structure to a metallic fitting. The lamina layers comprise: at least one first lamina layer formed of a first material having a first CTE; and at least one second lamina layer formed of a second material different from the first material and having a second CTE different than the first CTE. The hybrid laminate composite tube structure has at least one property that is different in the axial direction than the hoop direction. An axial CTE of the hybrid laminate composite tube structure is tailored to provide a net zero CTE for the assembled structure.

27 Claims, 10 Drawing Sheets

(51) Int. Cl.
*B29C 70/44* (2006.01)
*B29K 707/02* (2006.01)
*B29K 707/04* (2006.01)
*B29L 23/00* (2006.01)
*H01Q 1/28* (2006.01)

(52) U.S. Cl.
CPC ....... *B29K 2707/04* (2013.01); *B29L 2023/22* (2013.01); *H01Q 1/288* (2013.01)

(58) Field of Classification Search
CPC .............. H01Q 15/161; B29K 2707/02; B29K 2707/04; B29L 2023/22; B32B 3/08; B32B 27/08; B32B 2262/101; B32B 2262/103; B32B 2262/106; B32B 7/027; B32B 2307/30; B32B 2307/706; B32B 2307/732; B32B 2597/00; B32B 1/08
USPC ........................................................ 343/878
See application file for complete search history.

(56) References Cited

U.S. PATENT DOCUMENTS

| | | | |
|---|---|---|---|
| 5,041,699 A | | 8/1991 | Soliday |
| 5,048,441 A | | 9/1991 | Quigley |
| 5,439,746 A | | 8/1995 | Suzuki |
| 5,554,430 A | | 9/1996 | Pollatta et al. |
| 5,593,752 A | * | 1/1997 | Pollatta .................... B32B 5/12 |
| | | | 428/113 |
| 5,680,145 A | | 10/1997 | Thomson et al. |
| 5,686,930 A | | 11/1997 | Brydon |
| 5,993,934 A | | 11/1999 | Reese et al. |
| 7,595,769 B2 | | 9/2009 | Bassily |
| 9,505,177 B2 | | 11/2016 | Fujioka et al. |
| 2005/0126106 A1 | | 6/2005 | Murphy et al. |
| 2009/0176112 A1 | | 7/2009 | Kruckenberg et al. |
| 2011/0001086 A1 | | 1/2011 | Kruckenberg et al. |
| 2011/0064908 A1 | * | 3/2011 | Kweder ................ B29C 70/345 |
| | | | 428/113 |
| 2015/0361304 A1 | | 12/2015 | Gruhn et al. |
| 2019/0047248 A1 | | 2/2019 | Throckmorton et al. |

FOREIGN PATENT DOCUMENTS

| | | |
|---|---|---|
| EP | 2013408 A2 | 1/2009 |
| EP | 3012099 A1 | 4/2016 |
| EP | 3882013 | 9/2021 |
| WO | 2014118210 A1 | 8/2014 |

OTHER PUBLICATIONS

Pottish, Nancy, "Designing for dimensional stability in space" CW CompositesWorlk, Jul. 1, 2005.

Toor, Z.S., "Space Applications of Composite Materials," Journal of Space Technology, vol. 8, No. 1, Jul. 2018.

Yokoyama, T., et al., High-Precision Hybrid Composite Structures for Space Optics, 18th International Conference on Composite Materials, Aug. 21-26, 2011.

Ginty, Carol A., et al., "Composite Space Antenna Structures: Properties and Environmental Effects," NASA Technical Memorandum 88859, Prepared for the 18th International SAMPE Technical Conference, Oct. 7-9, 1986.

Extended European Search Report issued in EP 20189075.3 dated Jan. 27, 2021.

* cited by examiner

SYSTEMS AND METHODS FOR MAKING AND/OR USING COMPOSITE TUBE STRUCTURES FORMED OF HYBRID LAMINATES

CROSS REFERENCE TO RELATED APPLICATIONS

This application is a divisional application of and claims priority to U.S. patent application Ser. No. 16/563,663 entitled "SYSTEMS AND METHODS FOR MAKING AND/OR USING COMPOSITE TUBE STRUCTURES FORMED OF HYBRID LAMINATES", which was filed on Sep. 6, 2019 and is incorporated herewith in its entirety.

BACKGROUND

Statement of the Technical Field

The present document concerns composite tube structures. More particularly, the present document concerns systems and methods for making and/or using composite tube structures formed of hybrid laminates.

Description of the Related Art

Satellites require Radio Frequency ("RF") energy concentrating antennas to provide high gain. These antennas comprise precision parabolic or similar shaped antenna reflectors that are carried into space using launch vehicles. During travel, each precision antenna is stowed in a constrained volume within a launch vehicle. Thus, the precision antenna is designed to be transitioned from a relatively compact stowed position to a fully extended position at the time of its deployment. This transition typically relies on deployable mechanical structures. The deployable mechanical structures are often formed of tubes joined together. Each tube is surrounded by a Multi-Layer Thermal Insulation ("MLI") for protection against a relatively large thermal gradient. Changes in temperature of a surrounding environment causes the tubes to change lengths and/or diameter sizes. The MLI helps prevent or minimize the amount of change in the tube lengths and/or diameters. However, the MLI undesirably adds cost, complexity and weight to the deployable mechanical truss structures.

SUMMARY

This document concerns systems and methods for making a hybrid laminate composite tube structure. The methods comprise: wrapping a plurality of lamina layers around a male cylindrical tool (e.g., a non-tapered mandrel); treating the plurality of lamina layers with heat and pressure to form a hybrid laminate composite tube structure; and assembling a structure by adhesively bonding the hybrid laminate composite tube structure to at least one metallic fitting. The plurality of lamina layers are comprised of: at least one first lamina layer formed of a first material having a first coefficient of thermal expansion; and at least one second lamina layer formed of a second material different from the first material and having a second coefficient of thermal expansion different than the first coefficient of thermal expansion. The hybrid laminate composite tube structure may be comprised of a plurality of lamina materials, not limited to two. The composite tube structure has at least one property (e.g., a coefficient of thermal expansion, a stiffness and/or a strength) that is different in an axial direction than the hoop direction. An axial coefficient of thermal expansion of the hybrid laminate composite tube structure is tailored to provide a net zero coefficient of thermal expansion for the assembled structure.

In some scenarios, more than fifty percent of the lamina layers have fibers that extend in an axial direction. Less than fifty percent of the lamina layers have fibers that extend in a direction angled relative to a central elongate axis of the composite tube. Additionally or alternatively, a hoop coefficient of thermal expansion of the hybrid laminate composite tube structure is tailored to match the coefficient of thermal expansion of the fitting in the hoop direction so as to reduce thermal stress in the hybrid laminate composite tube structure.

In those or other scenarios, the fiber angles of the layers are not symmetric at the midplane of the composite tube wall. Additionally or alternatively, the hybrid laminate composite tube structure has a zero axial coefficient of thermal expansion or a near zero axial coefficient of thermal expansion. The coefficient of thermal expansion of the first material may be a positive coefficient of thermal expansion, and the coefficient of thermal expansion of the second material may be a negative coefficient of thermal expansion.

In those or other scenarios, one or more lamina layers comprise fibers of a first type (e.g., Carbon Fiber Reinforced Polymer ("CFRP"), fiberglass, boron fibers, titanium foil, etc.) and one or more lamina layers comprises fibers of a second type (e.g., CFRP, fiberglass, boron fibers, titanium foil, etc.) different than the first type. Both the volume ratio of the material of the first type to the material of the second type and the angle orientations of the fibers in the lamina layers are tailored to provide the hybrid composite tube structure with a zero axial coefficient of thermal expansion or a near zero axial coefficient of thermal expansion.

In those or other scenarios, each of the first and second lamina layers comprises fibers that extend in a direction that is angled 0° relative to a central elongate axis of the composite tube structure. A third lamina layer may also be provided. The third lamina layer is formed of a material having (1) the first or second coefficient of thermal expansion and (2) fibers that extend in a direction that is angled relative to the central elongate axis of the monolithic composite tube structure.

In those or other scenarios, the hybrid laminate composite tube structure is used to form an antenna truss structure.

This document also concerns antennas. The antennas comprise: a reflector; and a structure for supporting the reflector. The structure comprises a plurality of composite tubes structures adhesively bonded to metallic fittings. The composite tube structure may be created using a non-tapered male cylindrical mandrel. Each composite tube structure is formed of a plurality of lamina layers. The lamina layers are comprised of: at least one first lamina layer formed of a first material having a first coefficient of thermal expansion; and at least one second lamina layer formed of a second material different from the first material and having a second coefficient of thermal expansion different than the first coefficient of thermal expansion. The composite tube structure has at least one property (e.g., a coefficient of thermal expansion, a stiffness and/or a strength) that is different in an axial direction than the hoop direction. An axial coefficient of thermal expansion of each composite tube structure is tailored to provide a net zero coefficient of thermal expansion for the structure.

In some scenarios, more than fifty percent of the lamina layers have fibers that extend in the axial direction, and/or less than fifty percent of the lamina layers have fibers angled relative to a central elongate axis of the composite tube. Alternatively, or additionally, a hoop coefficient of thermal expansion of the composite tube structure is tailored to match the coefficient of thermal expansion of the fitting in the hoop direction so as to reduce thermal stress in the hybrid laminate composite tube structure.

In those of other scenarios, the fiber angles of the layers are not symmetric at the midplane of the composite tube wall. Additionally or alternatively, the composite tube structure has a zero axial coefficient of thermal expansion or a near zero axial coefficient of thermal expansion. The coefficient of thermal expansion of the first material may be a positive coefficient of thermal expansion, and the coefficient of thermal expansion of the second material may be a negative coefficient of thermal expansion.

In those or other scenarios, one or more lamina layers comprise fibers of a first type (e.g., CFRP, fiberglass, boron fibers, titanium foil, etc.) and one or more lamina layers comprises fibers of a second type (e.g., CFRP, fiberglass, boron fibers, titanium foil, etc.) different than the first type. Both the volume ratio of the material of the first type to the material of the second type and the angle orientations of the fibers in the lamina layers are tailored to provide the composite tube structure with a zero axial coefficient of thermal expansion or a near zero axial coefficient of thermal expansion.

In those or other scenarios, each of the first lamina layer and second lamina layer comprises fibers that extend in a direction that is angled 0° relative to a central elongate axis of the composite tube structure. At least one third lamina layer may also be provided. The third lamina layer is formed of a material having (1) the first or second coefficient of thermal expansion and (2) fibers that extend in a direction that is angled relative to the central elongate axis of the composite tube structure.

BRIEF DESCRIPTION OF THE DRAWINGS

This disclosure is facilitated by reference to the following drawing FIGURES, in which like numerals represent like items throughout the FIGURES.

DETAILED DESCRIPTION

Figure 1:
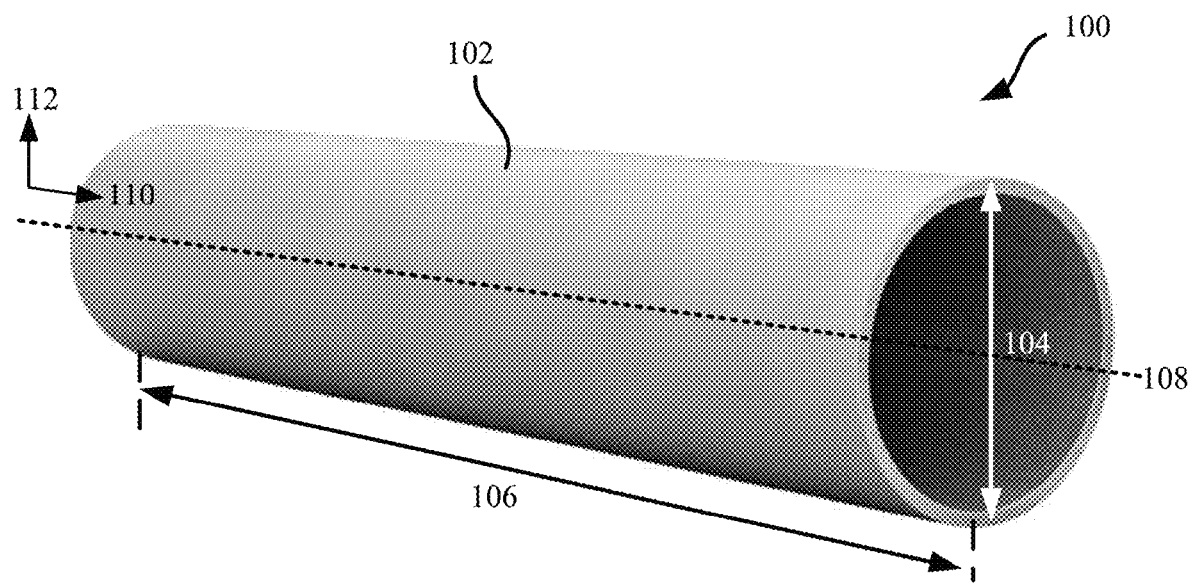
FIG. 1 is a perspective view of an illustrative composite tube structure.

It will be readily understood that the solution described herein and illustrated in the appended FIGURES could involve a wide variety of different configurations. Thus, the following more detailed description, as represented in the FIGURES, is not intended to limit the scope of the present disclosure, but is merely representative of certain implementations in various different scenarios. While the various aspects are presented in the drawings, the drawings are not necessarily drawn to scale unless specifically indicated.

Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

As noted above, satellites require RF energy concentrating antennas to provide high gain. These antennas comprise precision parabolic or similar shaped antenna reflectors that are carried into space using launch vehicles. During travel, each precision antenna is stowed in a constrained volume within a launch vehicle. Thus, the precision antenna is designed to be transitioned from a relatively compact stowed position to a fully extended position at the time of its deployment. This transition typically relies on deployable mechanical truss structures. The deployable mechanical truss structures are often formed of tubes movably joined together. Changes in temperature of a surrounding environment causes the tubes to change lengths and/or diameter sizes, which negatively affects antenna performance since the tension applied to the reflector surface increased or decreased with the changes in tube size. Thus, each tube is surrounded by one or more layers of MLI for protection against a relatively large thermal gradient. Although the MLI helps prevent or minimize the amount of change in the tube lengths and/or diameters, it undesirably adds cost, complexity and weight to the deployable mechanical truss structures.

The word "monolithic" is used herein when referring to curing multiple distinct lamina layers together into a conglomerate structure. A phrase "monolithic hybrid laminate composite tube" is used herein to refer to a cure of lamina layers. The phrase "hybrid laminate composite tube" and/or "hybrid laminate composite tube structure" is(are) used herein to refer to a laminate design, materials and/or orientations. The phrase "composite tube" and/or "composite tube structure" is(are) used herein to refer to a tube as a whole. The term "laminate" refers to all the layers together as a single monolithic structure. The term "lamina" refers to an individual layer of the laminate either before or after cure.

Therefore, the present solution provides a hybrid laminate composite tube structure that can be used to form a variety of larger structures. For example, the hybrid laminate composite tube structure is used to form a deployable mechanical truss structure for space-based applications which do not require outer layers of MLI. The hybrid laminate composite tube structure is formed of a material that has a zero axial CTE or a near zero axial CTE. As such, the hybrid laminate composite tube structure experiences no change or a relatively small amount of change with regard to its elongate length when subjected to extreme temperature changes in a space environment. The present solution is not limited to the particulars of this example.

Figure 2:
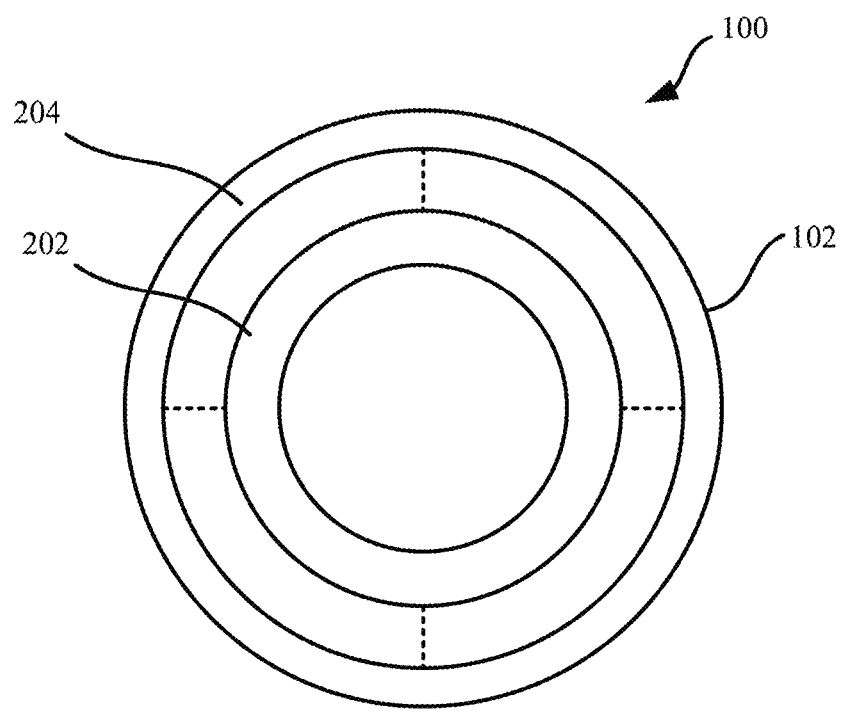
FIG. 2 is a cross section view of the composite tube structure shown in FIG. 1.

Referring now to FIGS. 1-2, there are provided illustrations of a monolithic composite tube structure 100. The monolithic composite tube structure 100 comprises an elongate cylindrical hollow body 102. Body 102 has an elongate length 106 that extends along a central elongate axis 108. The body 102 also has a diameter 104. The body 102 is formed of a hybrid component structure that contains a plurality of laminated layers 202, . . . , 204.

The laminated layers 202, . . . , 204 include fibers of the same or at least two different types (e.g., at least one layer containing first fibers formed of carbon and at least one second layer containing second fibers formed of boron, tungsten, titanium, and/or fiberglass). The fibers of each laminated layer can point or extend in (a) a direction that is parallel to or angled 0° relative to the central elongate axis 108 (e.g., $\alpha=0°$) or (b) a direction that is angled relative to the central elongate axis 108 (e.g., $0°<+\alpha<+90°$ or $-90°<-\alpha<0°$). However, more than fifty percent of the laminated layers may have fibers that extend in an axial direction 110 (i.e., $\alpha=0°$), and less than fifty percent of the laminated layers may have fibers that extend in a direction angled relative to the central elongate axis 108 of the monolithic composite tube structure 100 (e.g., $0°<+\alpha<+90°$ or $-90°<-\alpha<0°$).

Figure 9:
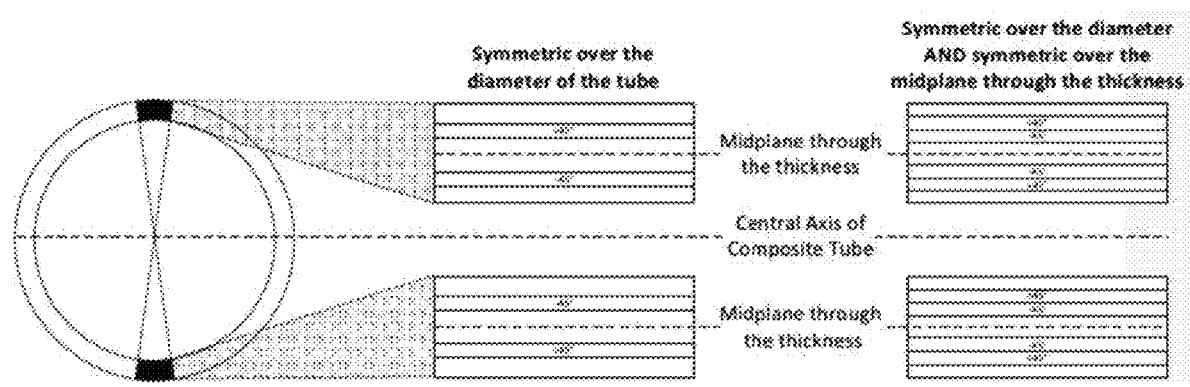
FIG. 9 provides an illustration that is useful for understanding a difference between symmetry across a diameter of a tube versus symmetry through a thickness of the tube.

The laminated layers 202, . . . , 204 are arranged concentrically. This ensures that the fiber angles $\alpha$ are symmetric over a diameter 104 of the tube 100. Notably, the fiber angles $\alpha$ of the laminated layers 202, . . . , 204 are not symmetric over the midplane through the thickness of the hybrid laminate. This means that the total fiber angle value of layer(s) above a middle layer is different than the total fiber angle value of layer(s) below the middle layer. This feature distinguishes the present solution from conventional flat laminates which have fibers symmetrically positioned about the midplane or through the thickness of the laminate material. FIG. 9 provides an illustration showing a difference between symmetry across a diameter of a tube versus symmetry through a thickness of the tube.

The hybrid component material of the tube structure 100 has at least one property that is different in an axial direction 110 (i.e., a direction that extends parallel to a central elongate axis 108 of the tube) and a hoop or transverse direction 112 (i.e., a direction that extends perpendicular to the central elongate axis 108 of the tube). The properties include, but are not limited to, a CTE, a stiffness, and/or a strength. In this regard, the present solution distinguishes from conventional flat panel hybrid laminates since the present solution is not isotropic or quasi-isotropic. The term "isotropic" means the same properties in all directions. The term "quasi-isotropic" means the same properties in at least two directions. In flat materials, the two directions include an x-axis (or 0°) direction (corresponding to the axial direction 110 of a tube) and a y-axis (or 90°) direction (corresponding to the transverse hoop direction 112 of a tube).

The hybrid composite laminate is formed of two or more different composite materials combined together to tailor a CTE of the tube so as to arrive at a zero axial CTE or a near zero axial CTE. The axial CTE is the CTE that indicates how much the length 106 of the tube 100 is going to expand and contract in an axial direction 110 when subjected to temperature changes. In space-based antenna applications, the zero axial CTE and/or near zero axial CTE negate(s) the negative system performance that is caused by the relatively large temperature extremes of a surrounding environment.

In some scenarios, the two different types of fibers contained in the hybrid composite laminate are selected to include (a) a first type of fibers that have a negative axial CTE whereby the fibers shrink in size when exposed to increased temperatures and (b) a second type of fibers that have a positive axial CTE whereby the fibers expand or elongate when exposed to increased temperatures. When the negative CTE constituent is combined with the positive CTE constituent in the single monolithic laminate, a net CTE is produced. The net CTE comprises a weighted average CTE of the two constituents. Accordingly, the hybrid component material of tube structure 100 comprises a ratio of negative axial CTE constituent(s) to positive axial CTE constituent(s) that provides a weighted average CTE that results in a zero axial CTE or a near zero axial CTE. The weighted average CTE is a function of ply CTEs, ply thicknesses, total number of plys, and ply fiber angle. Such a function may be defined by classical lamination theory which is well known in the art. The ratio of the first type of fibers to the second type of fibers is controlled by the total number of constituents, the total number of constituent layers, and/or the layer thicknesses. The hybrid component material of tube structure 100 can have any number of constituents greater than or equal to two, any number of constituent layers, and/or any layer thicknesses. These characteristics of the plys are selected in accordance with a given application so as to provide a laminate material with a zero axial CTE or a near zero axial CTE. As noted above, the weighted average CTE also depends on the ply fiber angles, i.e., the fiber directions relative to the central elongate axis 108 of the composite tube structure 100. The ply fiber angles can all be zero relative to a central elongate axis 108 of the composite tube structure (i.e., have zero ply fiber angles $\alpha=0°$), can all be non-zero relative to the central elongate axis 108 of the composite tube structure (i.e., have non-zero ply fiber angles $\alpha \neq 0°$), or can comprise a combination of zero and non-zero ply fiber angles. As such, the CTE of the present hybrid component material can be controlled by: altering the ratio of the first type of fibers to the second type of fibers; and/or altering the angle(s) of non-axial ply layer(s).

The tube structure also has a hoop CTE which indicates how much the tube's diameter 104 is going to expand and contract in a hoop or transverse direction 112. The hoop CTE is a non-zero CTE that is different than the axial CTE. In some scenarios, the hoop CTE of the tube structure 100 is tailored to match a CTE of a material that the tube interfaces with when used to form a larger structure (e.g., a deployable antenna truss structure). For example, the hoop CTE of the tube structure 100 is matched to a CTE of a metal end fitting used to couple the tube 100 to another tube. This CTE matching reduces thermal stress in the tube structure 100. The tube structure 100 may also have an axial CTE tailored to provide a net zero CTE for an assembled structure (e.g., a deployable antenna truss structure). The present solution is not limited in this regard.

Figure 3:
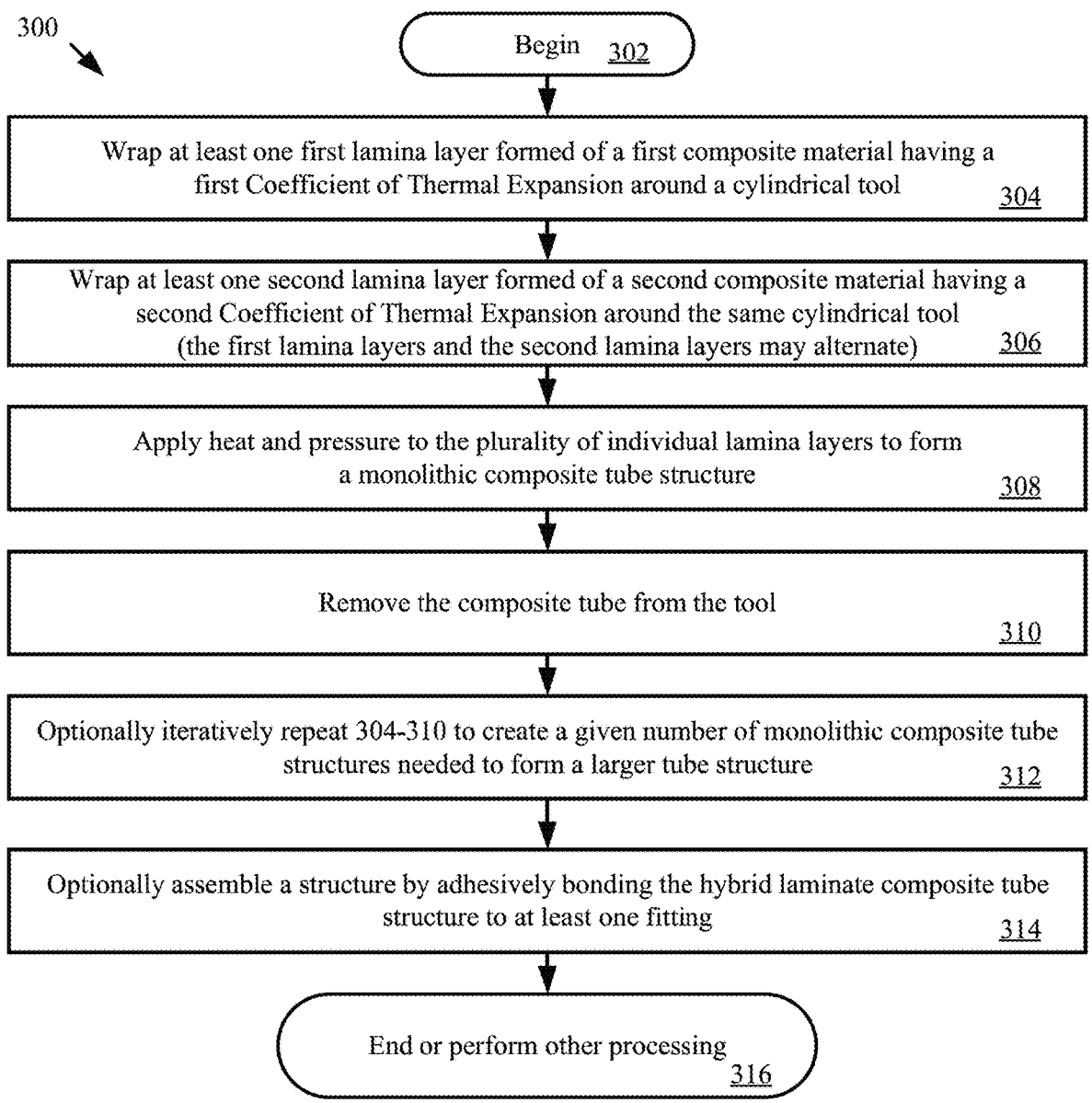
FIG. 3 is a flow diagram of an illustrative method for making a composite tube structure.

Referring now to FIG. 3, there is provided a flow diagram of an illustrative method 300 for making a monolithic tube structure (e.g., monolithic tube structure 100 of FIG. 1). Method 300 begins with 302 and continues with 304 where at least one first lamina layer is wrapped around a cylindrical tool (e.g., a non-tapered male cylindrical mandrel which may be made of metal). The first lamina layer is formed of a first composite material that has a first CTE. Next in 306, at least one second lamina layer is wrapped around the cylindrical tool. The second lamina layer is formed of a second composite material that is different from the first composite layer and has a second CTE that is different than the first CTE. The first lamina layers and the second lamina layers may alternate.

In 308, heat and pressure are applied to the plurality of individual lamina layers. The heat and pressure can be applied using a vacuum bag and an autoclave. Vacuum bags and/or autoclaves are well known in the art, and therefore will not be described herein. A monolithic composite tube structure is formed through the application of heat and pressure in 308. In this regard, it should be noted that resins of the first and second lamina layers flow when the heat and pressure are applied thereto. Polymers of the resins link together so as to couple the first and second lamina layers to each other. The monolithic tube structure has: at least one property that is different in the axial direction (e.g., axial direction 110 of FIG. 1) and the hoop direction (e.g., hoop direction 112 of FIG. 1); an axial CTE tailored to provide a net zero CTE for an assembled structure; and/or a hoop CTE tailored to match the CTE of a fitting in the hoop direction so as to reduce thermal stress in the monolithic tube structure. In some scenarios, more than fifty percent of the first and second lamina layers have fibers extending in the axial direction, and less than fifty percent of the first and second layers have fibers extending in a direction that is angled relative to the central elongate axis (e.g., central elongate axis 108 of FIG. 1) of the monolithic tube structure. The composite tube structure is removed from the cylindrical tool in 310.

The process of 304-310 can be optionally iteratively repeated to create any given number of monolithic composite tube structures needed to form a larger tube structure (e.g., an antenna truss structure).

Method 300 may continue with optional 316. In 316, a structure is assembled by adhesively bonding the monolithic tube structure to at least one fitting (e.g., a metallic fitting forming a joint between two or more monolithic tube structures). In some scenario, the structure comprises an antenna or an antenna truss structure. The fitting can include, but is not limited to, an end fitting for a tube structure. Adhesives are well known in the art, and therefore will not be described herein. Any known or to be known adhesive can be used herein without limitation. As noted above, an axial CTE of the monolithic tube structure is tailored to provide a net zero CTE for the assembled structure. The tailoring can involve changing ply angles, ply thicknesses, ratios of positive CTE constituents to negative CTE constituents, and/or the type(s) of fiber(s) contained in each layer of the composite material. Additionally, a hoop CTE of the monolithic tube structure is tailored to match the CTE of the fitting in the hoop direction so as to reduce thermal stress in the monolithic tube structure. This type of matching can be achieved by changing ply angles, ply thicknesses, ratios of positive CTE constituents to negative CTE constituents, and/or the type(s) of fiber(s) contained in each layer of the composite material. Subsequently, 316 is performed where method 300 ends or other processing is performed.

The following EXAMPLES are provided to illustrate certain embodiments of the present solution. The following EXAMPLES are not intended to limit the present solution in any way.

Example 1

A composite tube structure is formed of a laminate material. The laminate material is created in accordance with the above described process 300. The particulars of the laminate material are illustrated in the following TABLE 1.

TABLE 1

| Ply # | CTE | Thickness | Angle |
|---|---|---|---|
| 1 | $CTE_1$ | $th_1$ | 0.00 |
| 2 | $CTE_2$ | $th_2$ | 0.00 |
| 3 | $CTE_1$ | $th_1$ or $th_3$ | $0.00 < +\alpha < +90.00$, or $0.00 < -\alpha < -90.00$ |

As shown in TABLE 1, the laminate material comprises three laminated layers. The first and third layers are formed of a material having a first coefficient of thermal expansion $CTE_1$. The second or middle layer is formed of a material having a second coefficient of thermal expansion $CTE_2$. The second coefficient of thermal expansion $CTE_2$ is different from the first coefficient of thermal expansion $CTE_1$. The three laminated layers are selected to have properties and relative arrangements that provide a tube structure with a zero axial CTE or a near zero axial CTE.

In some scenarios, the first and third layers are formed of a prepreg material containing fibers of a first type, and the second layer is formed of a prepreg material containing fibers of a second type. The second type is different than the first type. For example, in some scenarios, the first type of fibers is a non-metal type of fibers (e.g., carbon fibers), and the second type of fibers is a metal type of fibers (e.g., boron, tungsten or titanium). In other scenarios, the first type of fibers is a metal type of fibers, and the second type of fibers is a non-metal type of fibers. In other scenarios, the first type of fibers is a first non-metal type of fibers, and the second type of fibers is a second non-metal type of fibers. Yet in other scenarios, the first type of fibers is a first metal type of fibers, and the second type of fibers is a second metal type of fibers. The present solution is not limited to the particulars of these scenarios.

The first and third layers have the same or different cure ply thickness. Accordingly in some scenarios, the first and third layers have the same thickness $th_1$. But in other scenarios, the first layer has a thickness of $th_1$ and the third layer has a thickness of $th_3$. The second or middle layer has a thickness $th_2$ that is different than the thicknesses of the first and third layers.

Each of the three layers contains a plurality of fibers that extend parallel to each other. The first and second layers are arranged so that the fibers thereof extend parallel relative to the central elongate axis (e.g., central elongate axis 108 of FIG. 1) of the composite tube. Such an arrangement of the first and second layers provides stiffness down the central elongate axis of the composite tube.

The third layer is arranged so that the fibers thereof extend in a direction that is angled relative to the central elongate axis of the monolithic composite tube structure (e.g., angled by ±1-89°). In order to provide the angled relationship between third layer's fiber direction and the central elongate axis direction, the material spirals down the length of the tube in a first direction (e.g., a clockwise direction or counterclockwise direction). Such an arrangement of the third layer provides transverse strength and stiffness of the composite tube structure (i.e., strength and stiffness in the hoop direction 112 of FIG. 1).

The axial CTE of the composite tube structure formed of the above described laminate material is tailored by: altering the angle of the non-axial ply layer (i.e., the third layer); and/or altering the ratio of the second type of fibers to the first type of fibers.

Example 2

A composite tube structure is formed of a laminate material. The laminate material is created in accordance with the above described process 300. The particulars of the laminate material are illustrated in the following TABLE 2.

TABLE 2

| Ply # | Prepreg Material Type | Thickness (mils) | Angle |
|---|---|---|---|
| 1 | Carbon Fibers/Resin | 2.5 | 0.00 |
| 2 | Carbon Fibers/Resin | 2.5 | 0.00 |
| 3 | Carbon Fibers/Resin | 2.5 | +45.00 or +54.00 |
| 4 | Carbon Fiber/Resin | 2.5 | 0.00 |
| 5 | Boron Fibers/Resin | 4.0 | 0.00 |
| 6 | Carbon Fibers/Resin | 2.5 | 0.00 |
| 7 | Carbon Fibers/Resin | 2.5 | −45.00 or −54.00 |
| 8 | Carbon Fibers/Resin | 2.5 | 0.00 |
| 9 | Carbon Fibers/Resin | 2.5 | 0.00 |

As shown in TABLE 2, the laminate material comprises nine laminated layers. Layers 1-4 and 6-9 comprise a prepreg tape formed of carbon fibers and a resin, and have a cured ply thickness of 2.5 mils. The midplane layer 5 comprises a prepreg tape formed of boron fibers and a resin, and has a cured ply thickness of 4.0 mils. The carbon fibers can include, but are not limited to, M55J carbon fibers available from Toray Composite Materials America, Inc. of Tacoma, Washington. The boron fibers can include, but is not limited to, boron coated tungsten wires from Specialty Materials of Lowell, Massachusetts. The resin of layers 1-9 can include, but is not limited to, an RS-3 resin available from Toray Composite Materials America, Inc. of Tacoma, Washington.

Notably, the carbon fibers have a negative axial CTE such that they will shrink in size when exposed to increased temperatures. In contrast, the boron fibers have a positive axial CTE so that they will expand or elongate when exposed to increased temperatures. When the negative CTE constituent is combined with the positive CTE constituent in a single monolithic laminate, a net CTE is provided (e.g., a weighted average CTE of the two constituents) that comprises a zero axial CTE or a near zero axial CTE.

Each of the nine layers contains a plurality of fibers that extend parallel to each other. Layers 1, 2, 4-6, 8 and 9 are arranged so that the fibers thereof extend parallel relative to the central elongate axis (e.g., central elongate axis 108 of FIG. 1) of the composite tube structure. Such an arrangement of the layers 1, 2, 4-6, 8 and 9 provides stiffness and strength down the central elongate axis of the composite tube structure. The stiffness and strength in the axial direction (e.g., direction 110 of FIG. 1) can be decreased by removing some of the layers containing fibers that extend parallel relative to the central elongate axis, and can be increased by adding more layers containing fibers that extend parallel relative to the central elongate axis.

Layers 3 and 7 are arranged so that the fibers thereof extend in a direction that is angled relative to the central elongate axis of the hybrid laminate composite tube structure (e.g., angled by ±45° or 54°). In order to provide the positive angled relationship between the third layer's fiber direction and the central elongate axis direction, the prepreg tape spirals down the length of the tube in a first direction (e.g., a clockwise direction). In order to provide the negative angled relationship between seventh layer's fiber direction and the central elongate axis direction, the prepreg tape spirals down the length of the tube in a second direction (e.g., a counter clockwise or anticlockwise direction) opposed from the first direction. Such an arrangement of the third and seventh layers provide transverse strength and stiffness of the hybrid laminate composite tube structure (i.e., strength and stiffness in the hoop direction 112 of FIG. 1).

The axial CTE of the hybrid laminate composite tube structure formed of the above described laminate material is tailored by: altering the angle of the non-axial ply layers (i.e., the third and seventh layers); and/or altering the ratio of the boron to carbon.

Figure 4:
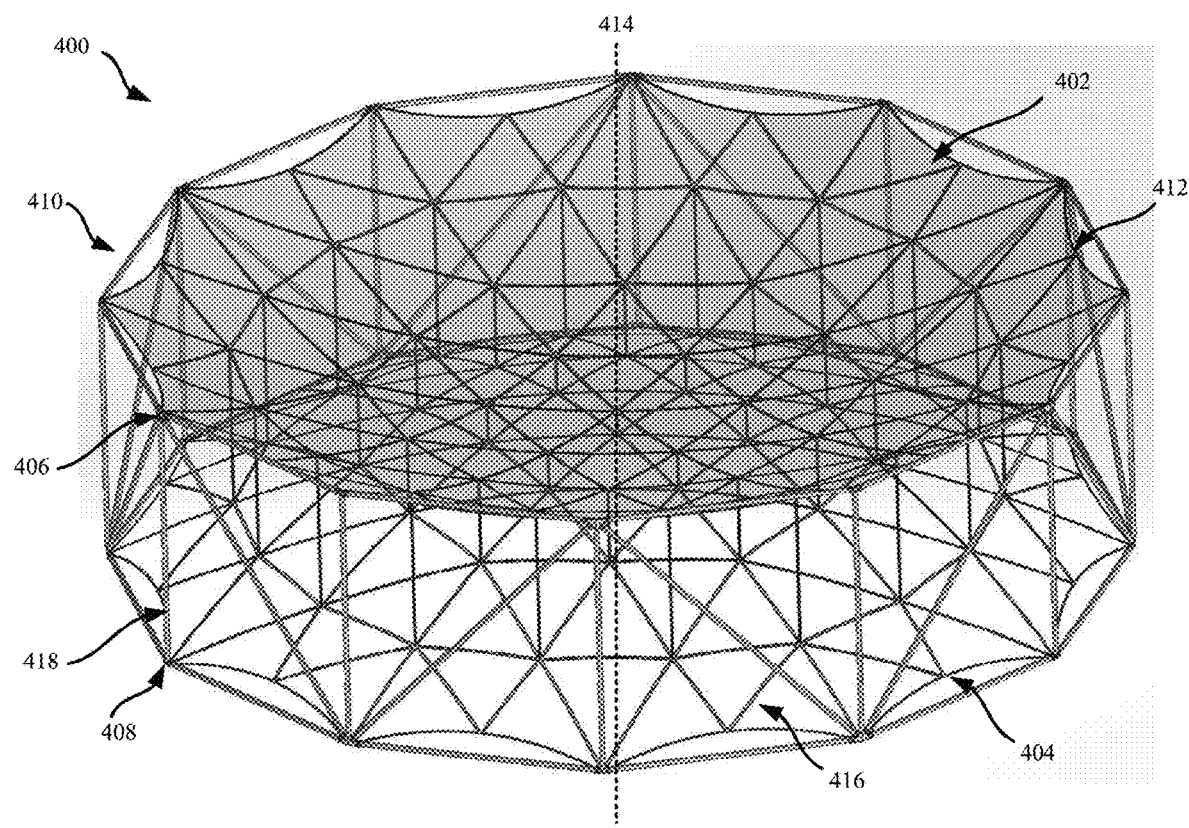
FIG. 4 is a perspective view of an extendable reflector in a fully extended position.
Figure 5:
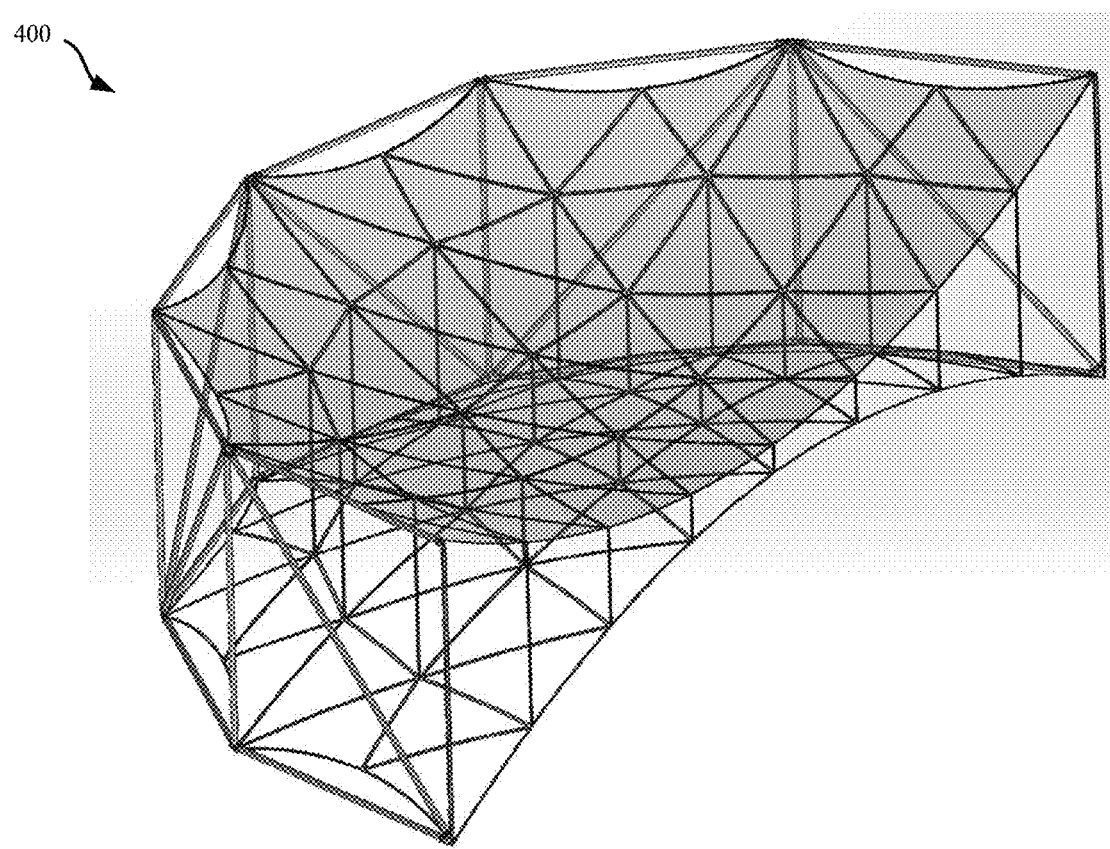
FIG. 5 is a cross-sectional view of the extendable reflector shown in FIG. 1.

Referring now to FIGS. 4-8, there are provided illustrations of an illustrative extendable reflector structure 400 implementing the present solution. The extendable reflector structure 400 has an appearance that is similar to a conventional radial perimeter truss reflector. In general, the deployable reflector structure 400 has a circular, parabolic shape when it is in its fully extended position as shown in FIG. 4. The deployable reflector structure 400 includes the flexible antenna reflector surface 402, the surface shaping (or tension) cord network 404, and a support structure 410. The support structure 410 is also referred to herein an antenna truss structure or a perimeter hoop structure.

The reflector surface 402 is formed from any material that is suitable as an antenna's reflective surface. Such materials include, but are not limited to, reflective wire knit mesh materials similar to light weight knit fabrics. In its fully extended position shown in FIG. 4, the reflector surface 402 has a size and shape selected for directing RF energy into a desired pattern. For example, the reflector surface 402 has a scalloped cup shape with concave peripheral edge portions 412. The present solution is not limited in this regard.

The reflector surface 402 extends around a central longitudinal axis 414 of the extendable reflector structure 400. As such, the reflector surface 402 may be a curve symmetrically rotated about the central longitudinal axis 414, a paraboloid rotated around an offset and inclined axis, or a surface shaped to focus the RF signal in a non-symmetric pattern.

The reflector surface 402 is fastened to the support structure 410 via the surface shaping cord network 404. The surface shaping cord network 404 supports the reflector surface 402 creating a parabolic shape. The reflector surface 402 is dominantly shaped by the surface shaping cord network 404.

The surface shaping cord network 404 defines and maintains the shape of the reflector surface 402 when in use. In this regard, the surface shaping cord network 404 includes a plurality of interconnected cords (or thread like strings) 416. The cords 416 are positioned between the reflector surface 402 and the support structure 410 so as to provide structural stiffness to the reflector surface 402 when the perimeter truss antenna is in use.

When the extendable reflector structure 400 is in its fully deployed configuration, the surface shaping cord network 404 is a stable structure under tension. The tension is achieved by applying pulling forces to the cords by means the support structure 410.

Figure 6:
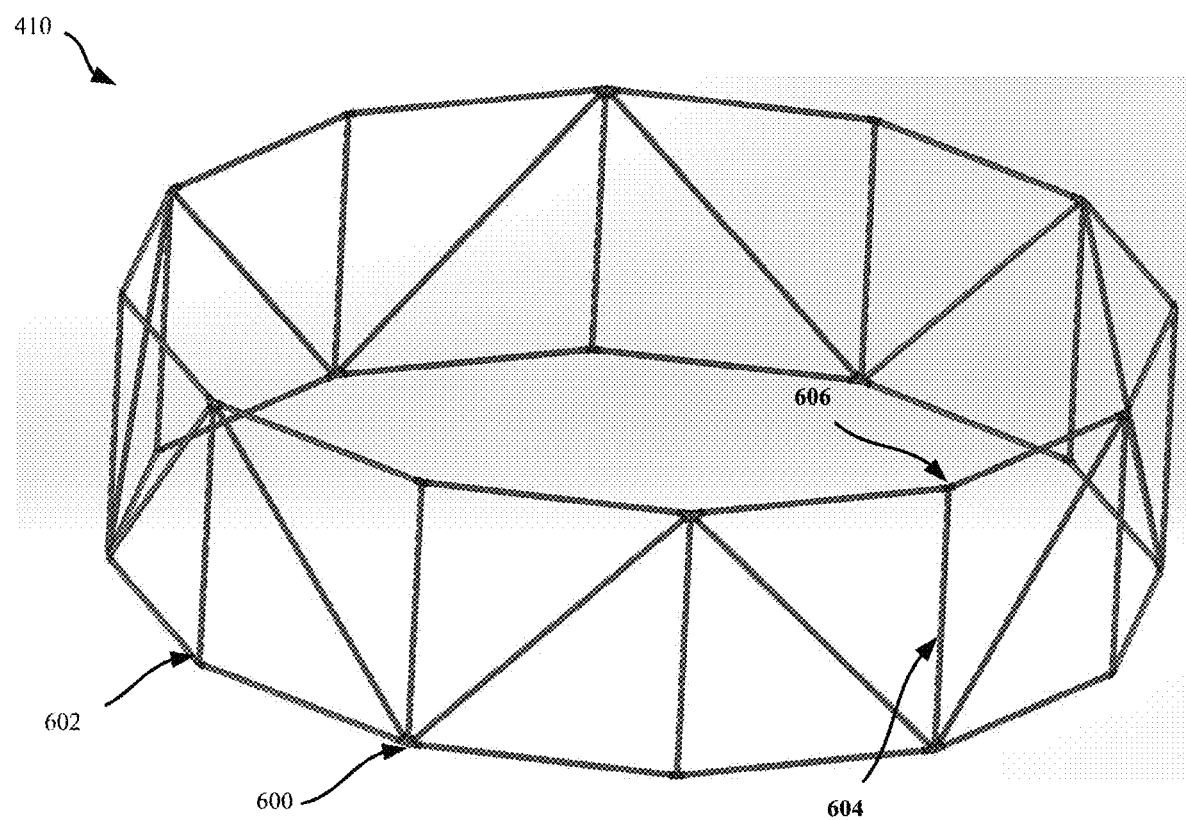
FIG. 6 is a perspective view of a perimeter hoop structure of the extendable reflector in a fully extended position.
Figure 7:
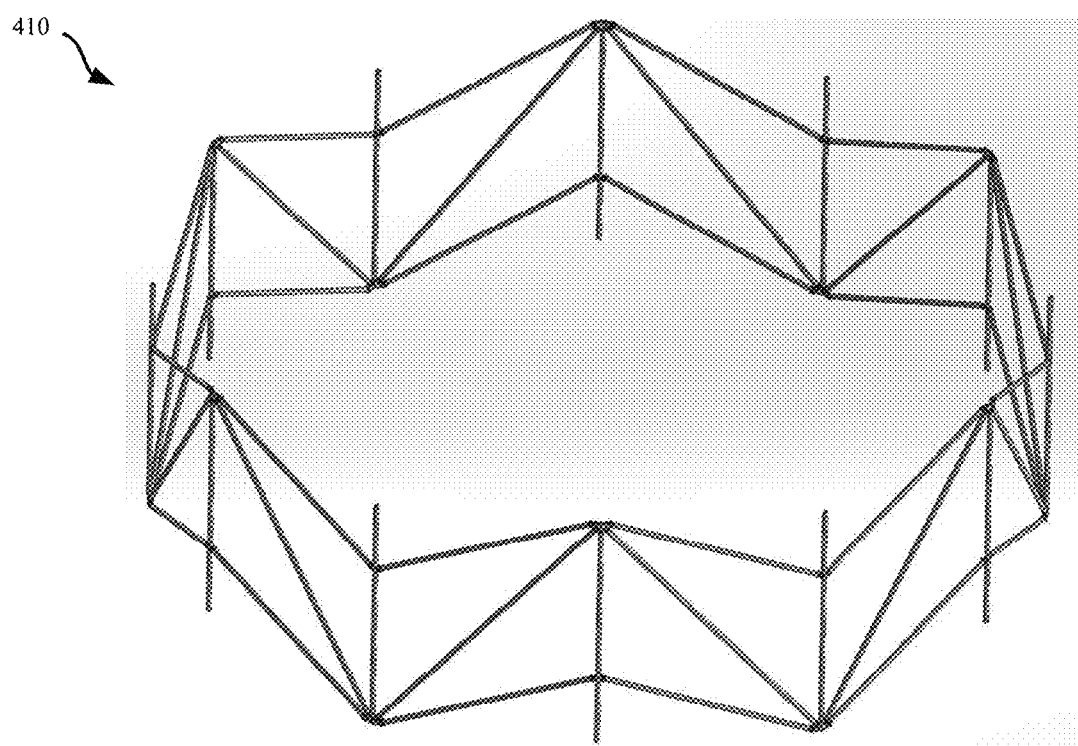
FIG. 7 is a perspective view of the perimeter hoop structure in a partially extended position.
Figure 8:
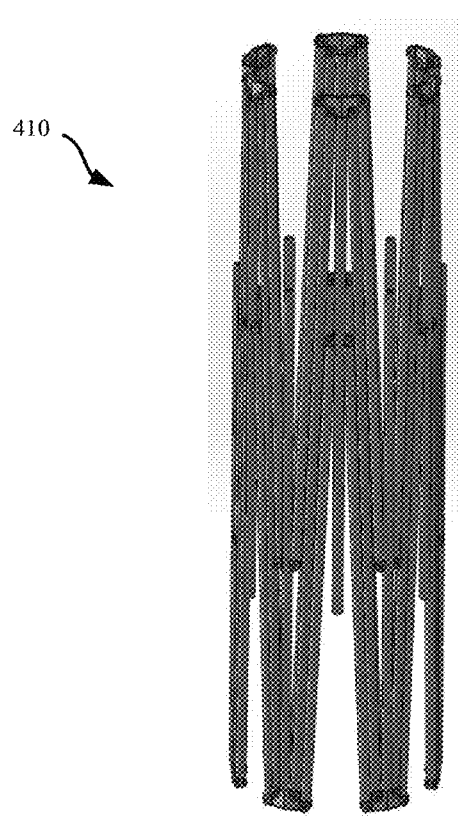
FIG. 8 is a perspective view of the perimeter hoop structure in the fully stowed position or a non-extended position.

The support structure 410 is a foldable structure that can be transitioned from a fully stored or non-extended position shown in FIG. 8 to a fully extended position shown in FIG. 6. A partially extended position of the support structure 410 is shown in FIG. 7. The support structure 410 is formed of a plurality of rigid battens 418 that are coupled to each other via joint mechanisms 600, 602. Joint mechanisms 600 simply allow battens to bend into and away from adjacent battens as shown in FIG. 7. In contrast, joint mechanisms 602 allow battens to move away from and towards adjacent battens, as well as allow horizontal battens 604 to slide therethrough as also shown in FIG. 7.

The rigid battens 418 are formed of a plurality of hybrid laminate composite tube structures. The monolithic composite tube structures used here from battens 418 are the same as or similar to the monolithic composite tube structure 100 of FIGS. 1-2. As such, the discussion provided above in relation to the monolithic composite tube structure 100 is sufficient for understanding the rigid battens 418. Notably, a hoop CTE of the rigid battens 418 is matched to a CTE of a material of the joints 406, 408 that the battens interface with when used to form the support structure 410.

Figure 10:
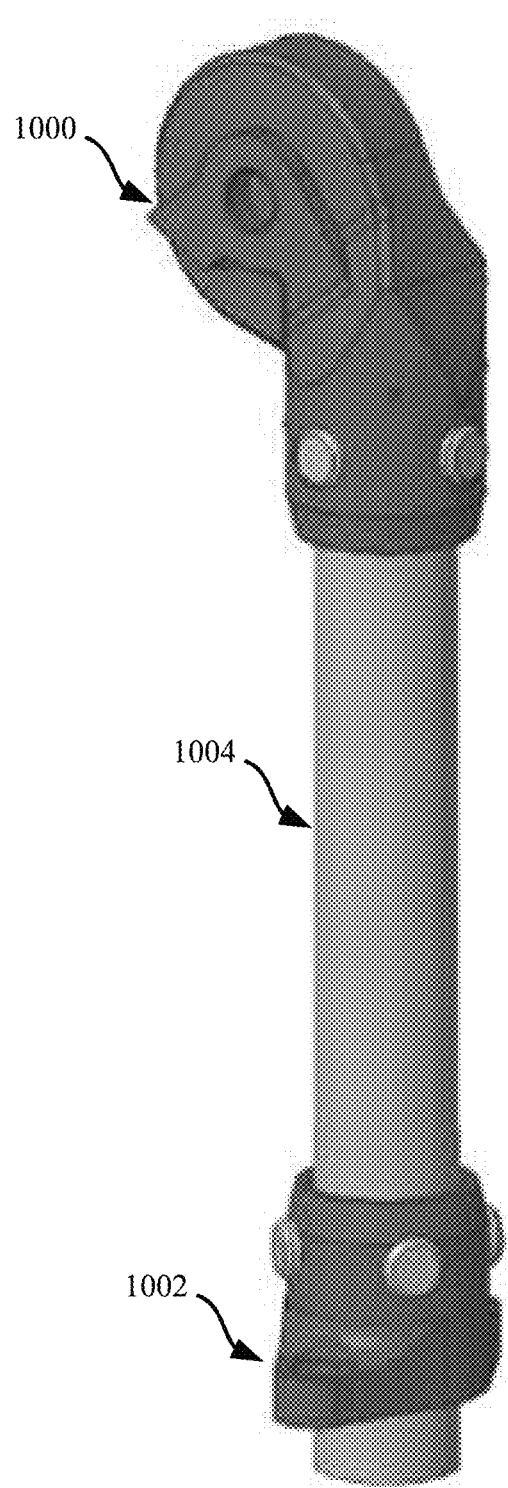
FIG. 10 is an illustration of an illustrative fittings coupled to a composite tube structure.

Referring now to FIG. 10, there is provided an illustrative of illustrative fittings 1000, 1002 coupled to a composite tube structure 1004. The fittings 1000, 1002 may be formed of metal. The fittings 1000, 1002 are coupled to the tube 1004 via an adhesive and/or other coupling means (e.g., screws, nuts, bolts, clamps, snap-fit couplers, etc.). The fitting 1000 includes, but is not limited to, a fitting having a part number 3289928-001 (fitting, pivot, guide) and being is available from Proto Labs, Inc. of Minnesota. The fitting 1002 includes, but is not limited to, a fitting having a part number 3289925-001 (fitting, latch, tension tube) and being available from Proto Labs, Inc. of Minnesota. The composite tube structure 1004 is the same as or similar to composite tube structure 100. As such, the above discussion of composite tube structure 100 is sufficient for understanding composite tube structure 1004.

Figure 11:
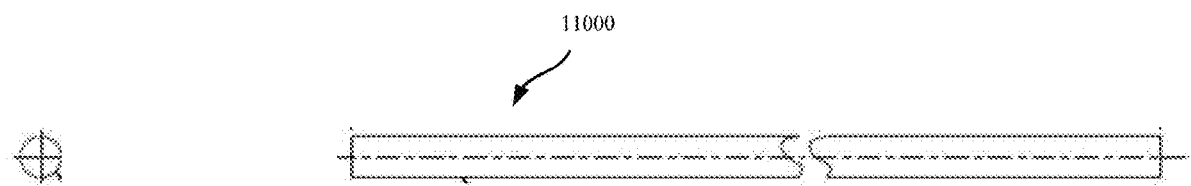
FIG. 11 is an illustration of an illustrative mandrel that may be used to create a composite tube structure.

Referring now to FIG. 11, there is provided an illustration of an illustrative mandrel 1100 that can be used to create a composite tube structure in accordance with the present solution. The mandrel 1100 includes, but is not limited to, a mandrel having a part number 23199-0021 (PT Mandrel, ⁹⁄₃₂″) and being available from Convertech of New Jersey.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

I claim:

1. An assembled structure, comprising:
a tube structure comprising a plurality of lamina layers comprising
at least one first lamina layer formed of a first material having a first coefficient of thermal expansion, and
at least one second lamina layer formed of a second material different from the first material and having a second coefficient of thermal expansion different than the first coefficient of thermal expansion; and
at least one metallic fitting adhesively bonded to the tube structure;
wherein the tube structure has at least one property that is different in an axial direction than a hoop direction; and
wherein an axial coefficient of thermal expansion of the tube structure is tailored to provide a net zero coefficient of thermal expansion for the assembled structure.

2. The assembled structure according to claim 1, wherein a hoop coefficient of thermal expansion of the tube structure is tailored to match the coefficient of thermal expansion of the fitting in the hoop direction so as to reduce thermal stress in the tube structure.

3. The assembled structure according to claim 1, wherein the tube structure is created using a non-tapered male cylindrical mandrel.

4. The assembled structure according to claim 1, wherein more than 50% of said plurality of lamina layers have fibers that extend in the axial direction, and less than 50% of said plurality of lamina layers have fibers that are angled relative to a central elongate axis of the tube structure.

5. The assembled structure according to claim 1, wherein fiber angles of the plurality of lamina layers are not symmetric about a midplane of a composite tube wall.

6. The assembled structure according to claim 1, wherein the tube structure has a near zero axial coefficient of thermal expansion.

7. The assembled structure according to claim 1, wherein the at least one property comprise a coefficient of thermal expansion, a stiffness or a strength.

8. The assembled structure according to claim 1, wherein the first coefficient of thermal expansion is a positive coefficient of thermal expansion, and the second coefficient of thermal expansion is a negative coefficient of thermal expansion.

9. The assembled structure according to claim 1, wherein the at least one first lamina layer comprises fibers of a first type and the at least one second lamina layer comprises fibers of a second type different than the first type.

10. The assembled structure according to claim 9, wherein the fibers of the first type comprise non-metal fibers and fibers of the second type comprise metal fibers.

11. The assembled structure according to claim 9, wherein a volume ratio of a material of the at least one first lamina layer to a material of the at least one second lamina layer and angles of orientations of the fibers in the plurality of lamina layers are selected to provide the tube structure with a near zero axial coefficient of thermal expansion.

12. The assembled structure according to claim 1, wherein each of the at least one first lamina layer and the at least one second lamina layer comprises fibers that extend in a direction that is angled 0° relative to a central elongate axis of the tube structure.

13. The assembled structure according to claim 12, wherein the plurality of lamina layers further comprise at least one third lamina layer formed of a material having (1) the first or second coefficient of thermal expansion and (2) fibers that extend in a direction that is angled relative to the central elongate axis of the tube structure.

14. The assembled structure according to claim 1, wherein the tube structure comprises an antenna truss structure.

15. An antenna, comprising:
a reflector; and
a structure for supporting the reflector, the structure comprising a plurality of composite tube structures adhesively bonded to metallic fittings, each said composite tube structure formed of
a plurality of lamina layers comprising
at least one first lamina layer formed of a first material having a first coefficient of thermal expansion, and
at least one second lamina layer formed of a second material different from the first material and having a second coefficient of thermal expansion different than the first coefficient of thermal expansion;
wherein the composite tube structure has at least one property that is different in an axial direction and a hoop direction; and
wherein an axial coefficient of thermal expansion of each said composite tube structure is tailored to provide a net zero coefficient of thermal expansion for the structure.

16. The antenna according to claim 15, wherein a hoop coefficient of thermal expansion of the composite tube structure is tailored to match the coefficient of thermal expansion of the fitting in the hoop direction so as to reduce thermal stress in the composite tube structure.

17. The antenna according to claim 15, wherein the composite tube structure is created using a non-tapered male cylindrical mandrel.

18. The antenna according to claim 15, wherein more than 50% of said plurality of lamina layers have fibers that extend in the axial direction, and less than 50% of said plurality of lamina layers have fibers angled relative to a central elongate axis of the composite tube structure.

19. The antenna according to claim 15, wherein fiber angles of the plurality of lamina layers are not symmetric about a midplane of a tube wall.

20. The antenna according to claim 15, wherein the composite tube structure has a near zero axial coefficient of thermal expansion.

21. The antenna according to claim 15, wherein the at least one property comprises a coefficient of thermal expansion, a stiffness or a strength.

22. The antenna according to claim 15, wherein the first coefficient of thermal expansion is a positive coefficient of thermal expansion, and the second coefficient of thermal expansion is a negative coefficient of thermal expansion.

23. The antenna according to claim 15, wherein the first lamina layer comprises fibers of a first type and the second lamina layer comprises fibers of a second type different than the first type.

24. The antenna according to claim 23, wherein the fibers of the first type comprise non-metal fibers and fibers of the second type comprise metal fibers.

25. The antenna according to claim 23, wherein a volume ratio of a material of the first lamina layer to a material of the second lamina layer and angles of orientations of the fibers in the plurality of lamina layers are selected to provide the composite tube structure with a near zero axial coefficient of thermal expansion.

26. The antenna according to claim 15, wherein each of the at least one first lamina layer and the at least one second lamina layer comprises fibers that extend in a direction that is angled 0° relative to a central elongate axis of the composite tube structure.

27. The antenna according to claim 26, wherein the plurality of lamina layers further comprise at least one third lamina layer formed of a material having (1) the first or second coefficient of thermal expansion and (2) fibers that extend in a direction that is angled relative to the central elongate axis of the composite tube structure.

* * * * *